United States Patent [19]

Anderson et al.

[11] Patent Number: 4,736,597

[45] Date of Patent: Apr. 12, 1988

[54] TRANSPORT REFRIGERATION SYSTEM

[75] Inventors: Lowell M. Anderson, Bloomington; Rodney H. Volk, Eden Prairie, both of Minn.

[73] Assignee: Thermo King Corporation, Minneapolis, Minn.

[21] Appl. No.: 35,801

[22] Filed: Apr. 8, 1987

[51] Int. Cl.$^4$ ............................................... B60P 3/20
[52] U.S. Cl. ........................................ 62/239; 62/263
[58] Field of Search ................. 62/239, 262, 263, 429

[56] References Cited

U.S. PATENT DOCUMENTS

| | | |
|---|---|---|
| 2,472,792 | 6/1949 | Cobler ................................... 62/262 |
| 2,796,745 | 6/1957 | Rose ................................... 62/429 X |
| 3,421,340 | 1/1969 | Von Berg . |
| 3,871,188 | 3/1975 | Vold et al. . |
| 4,109,485 | 8/1978 | Grosskopf . |
| 4,129,996 | 12/1978 | Hardin et al. ........................... 62/262 |
| 4,132,088 | 1/1979 | Grosskopf . |
| 4,182,134 | 1/1980 | Viegas et al. . |
| 4,348,871 | 9/1982 | Androff . |
| 4,365,484 | 12/1982 | Carson et al. . |
| 4,551,986 | 11/1985 | Anderson et al. . |
| 4,637,223 | 1/1987 | Hosoya et al. ........................... 62/263 |
| 4,641,502 | 2/1987 | Aldrich et al. ................... 62/429 X |

Primary Examiner—William E. Tapolcai
Attorney, Agent, or Firm—D. R. Lackey

[57] ABSTRACT

A transport refrigeration system suitable for narrow post highway trailers in which the refrigeration system intrudes into the trailer cargo space only to the extent necessary to direct trailer air into an evaporator. The evaporator is completely serviceable external to the trailer, with its inlet surface being substantially co-planar with the inside surface of the front wall of the trailer. An air delivery unit is manufactured as an integral assembly and mounted in a main support frame of the transport refrigeration system without requiring further adjustment. Mounting of the air delivery unit completes a plenum chamber for the evaporator, placing an axially narrow blower into an air flow path in which the blower draws trailer air through the evaporator and forces conditioned air back into the trailer. Mounting of the air delivery unit also places a fan into an air flow path in which outside air is directed upwardly through a condenser, and laterally through an engine radiator.

6 Claims, 3 Drawing Sheets

TRANSPORT REFRIGERATION SYSTEM

BACKGROUND OF THE INVENTION

1. Field of the Invention

The invention relates in general to transport refrigeration systems, and more specifically to transport refrigeration systems for narrow post highway trailers.

2. Description of the Prior Art

There are two types of regrigerated highway trailers, distinguished by the way the front wall of the trailer is supported. The two types are commonly referred to as "narrow post" and "wide post".

Narrow post trailers have the main trailer front wall support structure spaced about three feet (91 cm) apart, and the opening for accommodating a transport refrigeration system mounted on the front wall must fit between the supports of the support structure. This opening is usually twenty eight inches (71 cm) high and thirty seven inches (94 cm) wide. Transport refrigeration systems of the prior art for narrow post trailers conventionally include narrow box type evaporator sections which intrude into the interior trailer space by a dimension which is approximately three feet (91 cm) wide, two and one-half feet (76 cm) high, and three and one-third feet (101 cm) deep.

Wide post trailers have the main trailer front wall support structure spaced about sixty eight inches (173 cm) apart. Front wall openings are usually about forty six inches (117 cm) high and sixty inches (152 cm) wide. Transport refrigeration systems for wide post application are about one-third larger in exterior volume than systems for narrow post application, with the larger volume and large opening to the cargo space permitting innovative system designs which result in a much smaller intrusion of the refrigeration system into the cargo space. For example, systems such as shown in U.S. Pat. Nos. 4,182,134 and 4,551,986, which are assigned to the same assignee as the present application, require only about a four inch (10 cm) intrusion into the cargo space. This intrusion is about the minimum, as it is occupied by ductwork which directs air from the lower part of the trailer into the evaporator section of the refrigeration system.

The minimal intrusion of the wide post transport refrigeration systems into the cargo space, commonly referred to as zero cube units, is a highly desired feature, as it enables substantially all of the cargo space to be used. Thus, it would be desirable to reduce the intrusion of the narrow post transport refrigeration systems into the cargo space, if this can be accomplished without excessively increasing the weight and size of the overall unit package. For example, any rearrangement of the components of the transport refrigeration system must not increase the depth dimension of the unit beyond about 22.3 inches (56.6 cm), i.e., the measurement from the front wall of the trailer towards the tractor.

SUMMARY OF THE INVENTION

Briefly, the present invention is a new and improved transport refrigeration system for narrow post highway trailers which reduces the intrusion of the unit into the cargo space to four inches (10 cm), the same as the intrusion in wide post trailers, while simultaneously providing increased service accessibility not previously available with the presently used narrow post or wide post units. The transport refrigeration system, which includes a compressor, an internal combustion engine for driving the compressor, a condenser, an evaporator, and means for delivering air to the condenser, evaporator, and radiator of the internal combustion engine, is completely serviceable from outside the trailer, unlike most prior art narrow post transport refrigeration systems. For example, evaporator controls for the evaporator section, including expansion valve, valve control bulb, defrost termination switch, and defrost air pressure sensing probes, are accessible for servicing from the trailer exterior, on one side of the transport refrigeration unit. The remaining refrigeration controls are mounted so they are accessible on the other side of the unit. The power pack for driving the compressor, and the compressor, are accessible from the front and sides of the unit.

Air delivery for the condenser, evaporator, and engine radiator is provided by a single integral assembly which has a very narrow depth dimension. This integral assembly, which includes a fan and drive pulley on one side of a support flange, and a blower and blower inlet on the other side of the support flange, is adjustable as a separate assembly before being installed on a main support frame of the transport refrigeration unit. The entire assembly can also be removed from the support frame for servicing without interfering with the cargo space of the associated trailer.

The support flange of the air delivery unit, which is mounted on an intermediate wall of the main support frame, forms a common wall of condenser and evaporator plenums. The intermediate support wall has a top portion which inclines upwardly towards the rear of the main support frame, with this top portion also defining a common wall of the condenser and evaporator plenums. The evaporator coil has planar, parallel inlet and outlet surfaces which are vertically oriented, with the planar inlet surface substantially continuing the inner wall of the trailer. The condenser is mounted in an opening defined by the top of the main support frame, and the radiator for the internal combustion engine which drives the compressor is a narrow elongated structure which mounts in a narrow but relatively high opening defined by one of the sides of the main support frame. Thus, the fan of the air delivery system forces outside air through both the condenser coil, which is above the fan, and the radiator, which is along one side of the fan. The blower, which is on the same shaft as the fan, draws trailer air through the evaporator coil, and forces conditioned air back into the trailer via the evaporator plenum which is defined in part by the mounting flange of the air delivery unit, the top of the intermediate support wall, and the top of the evaporator coil.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF THE PREFERRED EMBODIMENTS

Figure 1:
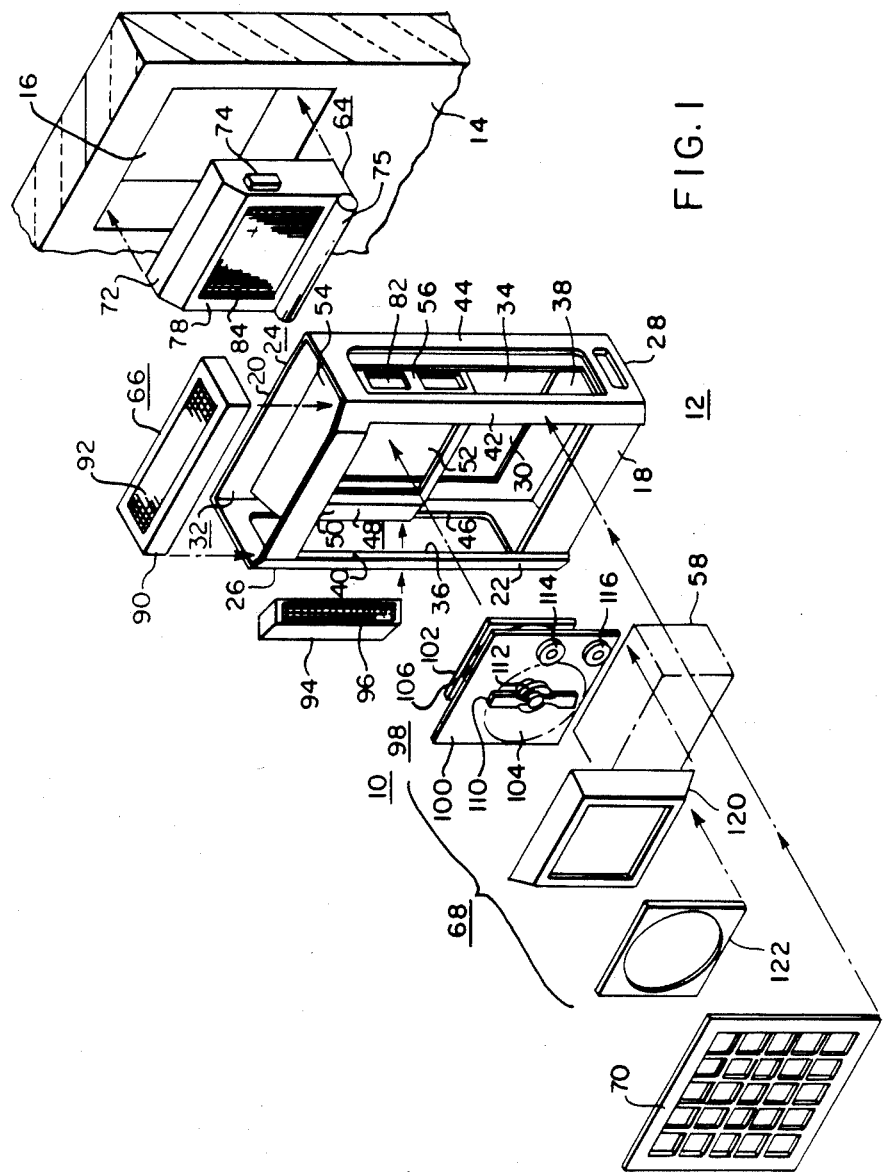
FIG. 1 is an exploded perspective view of a transport refrigeration system constructed according to the teachings of the invention.
Figure 2:
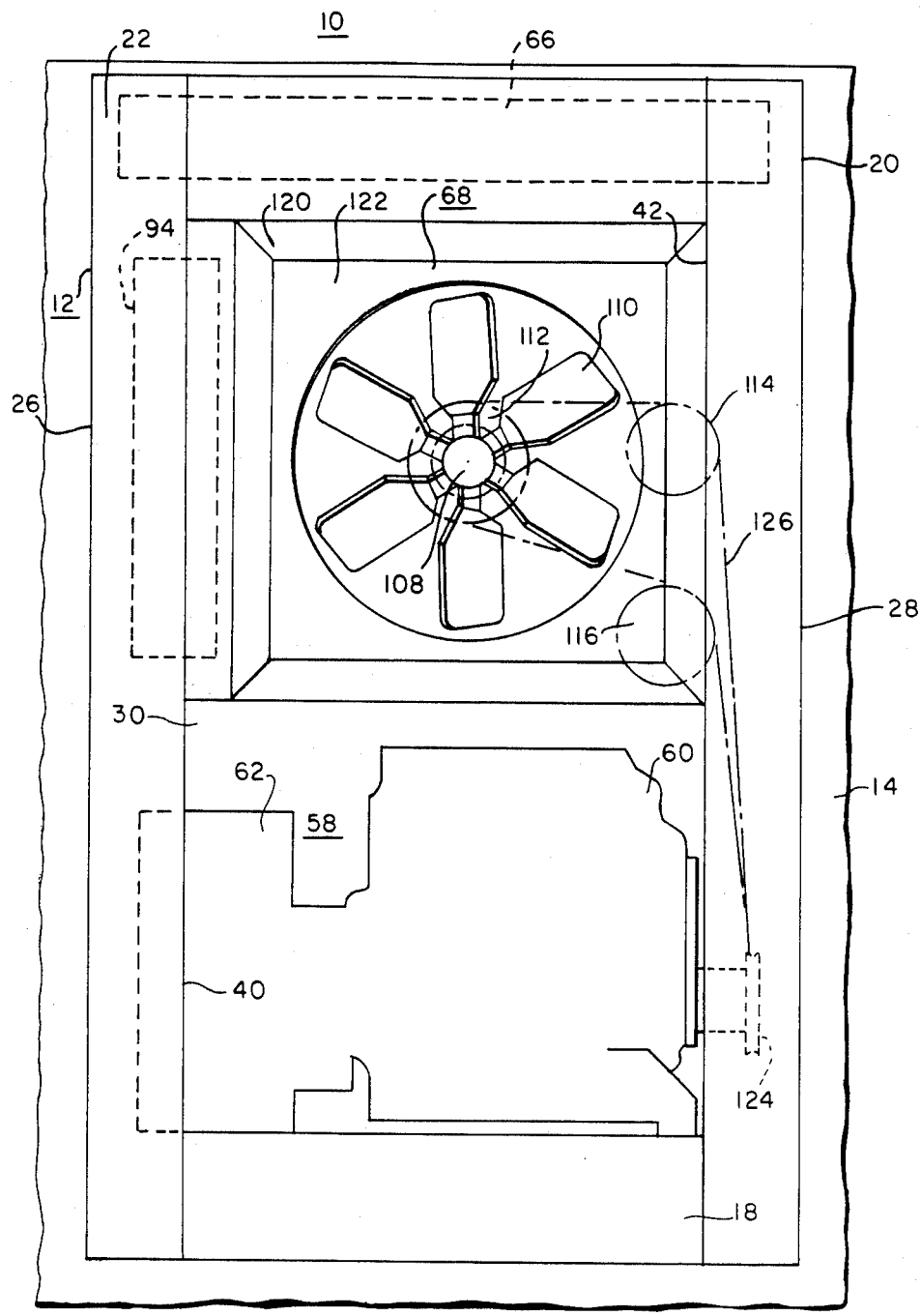
FIG. 2 is a front elevational view of the transport refrigeration system shown in FIG. 1.
Figure 3:
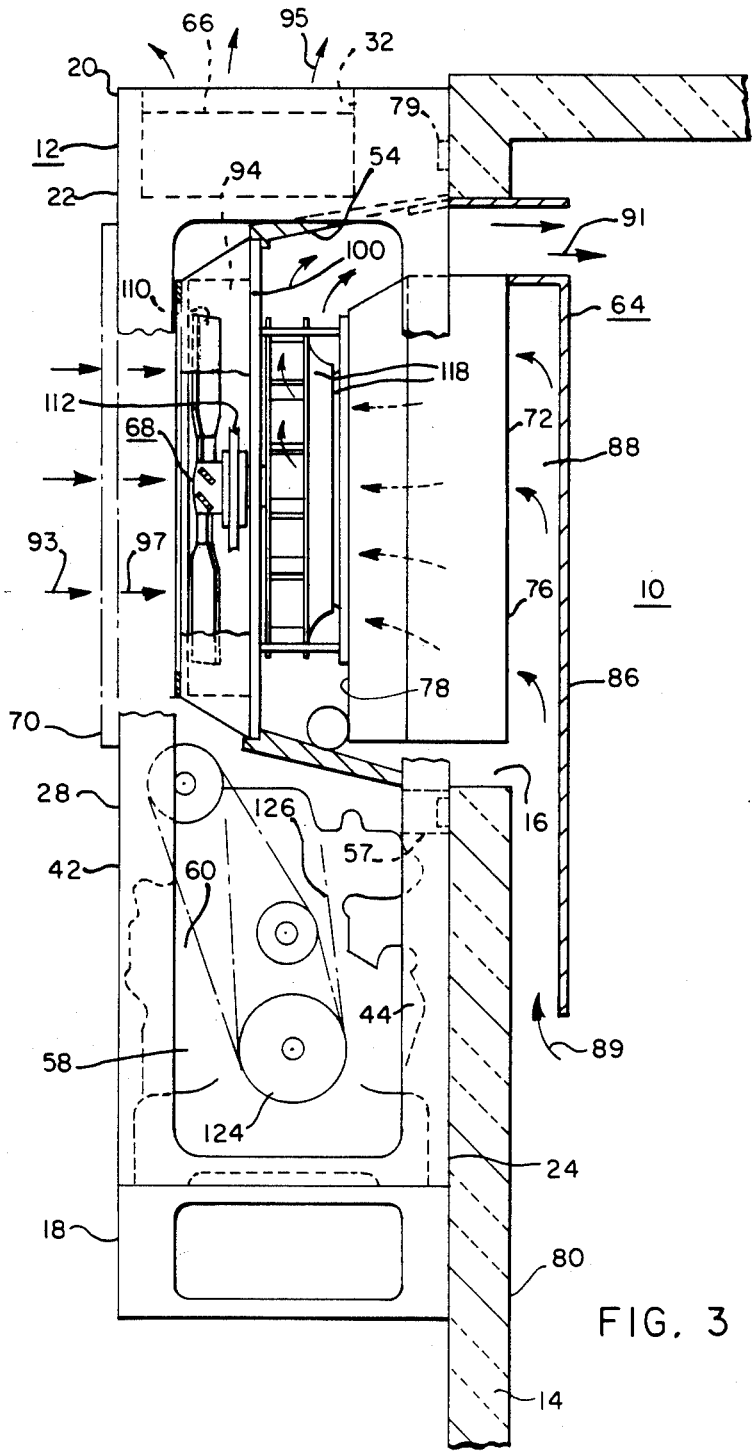
FIG. 3 is a side elevational view of the transport refrigeration system shown in FIG. 2, with some parts cut away in order to more clearly illustrate air flow paths through the system.

Referring now to the Figures, FIG. 1 is an exploded perspective view of a transport refrigeration system 10 constructed according to the teachings of the invention. FIGS. 2 and 3 will also be referred to in the following description, with FIG. 2 being an elevational view of the front of transport refrigeration system 10, with a grill removed, and FIG. 3 a side elevational view. Parts are broken away in FIG. 3 in order to more clearly illustrate air flow paths defined by the system.

More specifically, transport refrigeration system 10 includes a main structural frame 12 which is secured to the front 14 of a highway trailer which may be of narrow post construction. Front 14 has an opening 16 therein, which is sealed when system 10 is mounted on front 14, for circulation of trailer air thorough refrigeration system 10. Frame 12 includes a base 18, a top 20, front and rear portions 22 and 24, respectively, and first and second side portions 26 and 28, respectively. The front 22, top 20, rear 24, and first and second sides 26 and 28 define openings 30, 32, 34, 36 and 38, respectively. Thus, frame 12 essentially consists of a rectangularly shaped base 18, a rectangularly shaped top 20, and four vertically extending corner legs 40, 42, 44 and 46 which extend between the corners of the base and top. An intermediate support structure 48 is provided between the front and rear portions 22 and 24, with the intermediate support structure 48 including a vertically oriented wall 50 which defines an opening 52, a top 54 which angles or slopes upwardly from the upper edge of wall 50 to the back or rear portion 24, and side portions which extend from the lateral edges of wall 50 to the rear portion 24, such as side portion 56. A horizontally extending, intermediate cross piece 57 (FIG. 3) also extends between legs 44 and 46, across the rear 24 of frame 12. Side portion 56 has a plurality of openings therein for access to various controls, as well as to provide clearance for a drive belt. It will be noted that the intermediate support structure 48 extends from the top portion 20 of frame 12 towards the bottom portion 18, terminating well short of the bottom portion 18 to provide a relatively large open space in the lower part of frame 12 for receiving a power pack 58. As shown most clearly in FIG. 2, power pack 58 includes an internal combustion engine 60, such as a Diesel engine, and a refrigeration compressor 62 which is driven by engine 60.

Transport refrigeration system 10 further includes an evaporator coil assembly 64, a condenser coil assembly 66, air delivery means 68, and a grill 70.

Evaporator coil assembly 64 includes an evaporator coil 72, an expansion valve 74, heat exchanger 75, and other conventional items not shown, such as a valve control bulb, defrost termination switch, and defrost air pressure sensing probes. Evaporator coil 72 has planar, parallel, inlet and outlet surfaces 76 and 78, respectively. Evaporator coil assembly 64 is mounted in the upper rear portion of frame 12, through the opening 34 defined by rear 24, with its planar inlet and outlet surfaces 76 and 78 vertically oriented. As shown most clearly in FIG. 3, when the transport refrigeration system 10 is mounted on front wall 14, the evaporator coil 72 extends into opening 16 until the planar inlet surface 76 is in substantially the same vertical plane as inner surface 80 of the front wall 14. A gasket 79 surrounds and seals opening 16. The planar outlet surface 78 is in spaced parallel relation with the intermediate support wall 50, and the expansion valve 74 is aligned with an opening in side wall 56, such as opening 82. Evaporator coil 72 includes a plurality of horizontally oriented tubes 84, with the tubes having vertically oriented fins. Sheet metal 86 is attached to the evaporator coil 72 and spaced from the inlet surface 76 to define an air duct 88 which directs trailer air from the bottom portion of the trailer cargo space into the planar inlet surface 76 of the evaporator coil, as indicated by arrows 89 in FIG. 3.

The condenser assembly 66 includes a condenser coil 90 which is mounted in the top 20 of frame 12, via opening 32 defined by top 20. Condenser coil 90 includes a plurality of horizontally oriented tubes 92, with the associated fins being vertically oriented.

Internal combustion engine 60 includes a radiator 94 which is formed into a relatively thin but tall assembly such that it can be mounted adjacent to one of the sides of intermediate support structure 48, such as the side which is opposite to side 56. Radiator 94 includes a plurality of vertically oriented tubes 96 having horizontally oriented fins.

Air delivery means 68 includes an air delivery unit 98 having a mounting flange 100, first air moving or delivery means 102 mounted on a first side of mounting flange 100, and second air moving or delivery means 104 mounted on the second or remaining side of mounting flange 100. The first air delivery means 102 is preferably in the form of a blower 106 having a large diameter but minimal axial depth, as a blower is highly effective in redirecting air 90 degrees from an inlet angle. Blower 106 is mounted on a shaft 108 which extends through mounting flange 100 via suitable support bearings. the second air delivery means 104 is preferably in the form of a fan 110 in order to limit the starting inertia of the air delivery unit 98 and enable the unit to be started by engine 60 without the necessity of providing a clutch. Fan 110 is also mounted on shaft 108, adjacent to a driven pulley 112. A pair of idler pulleys 114 and 116 are also mounted on flange 100, on the same side as fan 110, adjacent to a vertical edge of flange 100. Air delivery unit 98 is completely adjustable as an integral assembly before it is mounted in frame 12, including the air inlet structure 118 for blower 106.

Air delivery unit 98 is mounted in frame 12 through opening 30 defined by front 22, with flange 100 being secured to vertical wall 50 of the intermediate support structure 48. Blower 106 extends into the relatively narrow space between wall 50 and the outlet surface 78 of the evaporator coil 72. Thus, when air delivery unit 98 is mounted in its operative position, flange 106 completes the air plenum or chamber for the evaporator coil assembly 64, and it operatively disposes blower 106 in a first air flow path in which the blower 106 draws trailer air through the evaporator coil 72, indicated by arrows 89, and forces conditioned air, indicated by arrows 91, back into the trailer via a plenum chamber which is defined by an upper sloping front portion and top of the evaporator coil assembly 64, the top 54 of the intermediate support structure 48, and one side of flange 100.

A chamber is formed about fan 110 via a shroud 120 and front plate 122, which members complete the air delivery means 68. This fan chamber directs external air in a second air flow path in which air entering the fan axially via grill 70, indicated by arrows 93, is directed both upwardly through condenser coil 90, indicated by arrows 95, and laterally through engine radiator 94, indicated by arrows 97. It will be noted that flange 100 forms a common wall between the evaporator and condenser plenums, as does the top 54 of the intermediate support structure 48.

Engine 60 includes a drive pulley 124 which links the driven pulley 112 and the idler pulleys 114 and 116 via a drive belt 126.

The disclosed transport refrigeration system 10 provides a compact assembly which fits into the limited space provided external to narrow post highway trailers, while intruding into the cargo space of the trailer only to the extent necessary to direct trailer air from the lower part of the trailer into the evaporator coil 72. The overhead mounting of the condenser 66, and the lateral mounting of the engine radiator 94, along with an air delivery unit 98 which has a relatively short axial dimension, all combine to meet the requisite dimensional requirements, providing an external package which does not significantly exceed the dimensions or weight of prior art units for narrow post trailers. In addition to providing a compact arrangement, the transport refrigeration system 10 of the invention makes it easier to service than prior art refrigeration systems for narrow post highway trailers, as the evaporator coil 72 and its controls are now serviceable external to the trailer. The trailer cargo is not disturbed. Further, the new and improved air delivery unit 98 can be manufactured and completely adjusted as an integral assembly before mounting the unit in support frame 12, unlike the air delivery systems of prior art narrow post refrigeration systems. Air delivery unit 98 can also be removed as a complete assembly, if necessary for service. The evaporator controls are all mounted on one side of the new and improved transport refrigeration system, and the remaining elements of the refrigeration system are mounted on the other side of the unit, including a receiver, accumulator, pilot valve, three-way valve, and drier. The power pack 58 is accessible from the front and both sides of frame 12, and the compressor is accessible from the front and one of the sides of frame 12, making transport refrigeration system 10 easy to service and maintain.

We claim as our invention:

1. A transport refrigeration system adapted for mounting on the front wall of a trailer having an opening therein, comprising:

a support frame having base, top, side, front and rear portions, with at least said front, rear, and top portions each defining major openings in said support frame, said support frame further including an intermediate support structure which extends outwardly from the rear portion of the frame towards the front portion, with said intermediate support structure including a vertically oriented support wall located between the front and rear portions of the frame which defines an opening, an evaporator coil assembly on said support frame, said evaporator coil assembly ncluding an evaporator coil which extends outwardly through the opening defined by the rear portion of said support frame for a predetermined small dimension, such that the evaporator coil extends into the trailer opening to effectively continue the front wall of the trailer with substantially no penetration of the evaporator coil into the trailer, a condenser assembly on said support frame, said condenser assembly including a condenser coil disposed in the opening defined by the top portion of said support frame, and an air delivery assembly mounted on the intermediate support structure, said air delivery assembly including a vertically oriented mounting flange having first and second major sides, and first and second air moving means mounted on said first and second major sides, respectively, said vertically oriented mounting flange of the air delivery assembly closing the opening in the vertically oriented support wall of the intermediate support structure whole operatively disposing the first and second air moving means in first and second air flow paths, respectively, said first air flow path including said evaporator coil, with said first air moving means drawing air from the trailer through said evaporator coil and discharging air back into the trailer, said second air flow path including said condenser coil, with said second air moving means drawing air thorugh the opening defined by the front portion of said support frame and forcing air through said condenser coil, said intermediate support structure further including a top portion which slopes upwardly from the vertically oriented support wall towards the rear portion of the support frame, with said top portion defining a common wall of evaporator and condenser plenums.

2. The transport refrigeration system of claim 1 wherein at least one of the side portions of the support frame defines an opening, and including a power unit on the support frame comprising a compressor coupled to an internal combustion engine having a radiator, said radiator being disposed in the opening defined by the at least one side portion, with the second air moving means forcing air through said radiator as well as through the condenser coil.

3. The transport refrigeration system of claim 1 wherein the evaporator coil has planar, parallel inlet and outlet surfaces, with said planar inlet and outlet surfaces being vertically oriented.

4. The transport refrigeration system of claim 1 wherein the air moving assembly is removable as a unit from the intermediate support structure, through the opening in the front portion of the support frame.

5. The transport refrigeration system of claim 4 wherein the first air moving means of the air moving assembly includes a fan, and the second air moving means includes a blower and inlet orifices.

6. The transport refrigeration system of claim 3 wherein the air delivery assembly includes a single shaft common to both the first and second air moving means, with said shaft having a longitudinal axis which intersects the evaporator coil assembly perpendicular to the vertically oriented, planar, parallel inlet and outlet surfaces.

* * * * *